(12) United States Patent
Glacer et al.

(10) Patent No.: US 11,668,683 B2
(45) Date of Patent: Jun. 6, 2023

(54) THERMAL EMITTER WITH EMBEDDED HEATING ELEMENT

(71) Applicant: Infineon Technologies AG, Neubiberg (DE)

(72) Inventors: Christoph Glacer, Munich (DE); Stefan Barzen, Munich (DE); Matthias Reinwald, Laaber (DE)

(73) Assignee: Infineon Technologies AG, Neubiberg (DE)

( * ) Notice: Subject to any disclaimer, the term of this patent is extended or adjusted under 35 U.S.C. 154(b) by 169 days.

(21) Appl. No.: 17/199,211

(22) Filed: Mar. 11, 2021

(65) Prior Publication Data

US 2021/0341433 A1    Nov. 4, 2021

(30) Foreign Application Priority Data

Apr. 29, 2020   (EP) .................................... 20172220

(51) Int. Cl.
*G01N 29/24* (2006.01)
*G01N 25/00* (2006.01)
(Continued)

(52) U.S. Cl.
CPC ......... *G01N 29/2418* (2013.01); *G01N 25/00* (2013.01); *G01N 29/02* (2013.01);
(Continued)

(58) Field of Classification Search
CPC .... G01N 29/2418; G01N 29/20; G01N 25/00; G01N 2291/021; G01N 2291/022;
(Continued)

(56) References Cited

U.S. PATENT DOCUMENTS 5,726,480 A * 3/1998 Pister ................... G01P 15/0802
257/773
2009/0151429 A1* 6/2009 Jun ...................... G01N 27/128
73/31.06
(Continued)

FOREIGN PATENT DOCUMENTS

JP        H08264844 A     10/1996
WO    2006031125 A1      3/2006

OTHER PUBLICATIONS

Lefebvre, Anthony et al., "Optimization of a radiative membrane for gas sensing applications", Proceedings of SPIE, IEEE, US, vol. 9141, May 15, 2014, XP060038066, DOI: 10.1117/12.2052273 ISBN: 978-1-62841-730-2, pp. 91410G-91410G-8.

(Continued)

*Primary Examiner* — Suman K Nath
(74) *Attorney, Agent, or Firm* — Slater Matsil, LLP

(57) ABSTRACT

A thermal emitter includes a freestanding membrane supported by a substrate, wherein the freestanding membrane includes in a lateral extension a center section, a conductive intermediate section and a border section, wherein the conductive intermediate section laterally surrounds the center section and is electrically isolated from the center section, the conductive intermediate section including a conductive semiconductor material that is encapsulated in an insulating material, wherein the border section at least partially surrounds the intermediate section and is electrically isolated from the conductive intermediate section, and wherein a perforation is formed through the border section.

17 Claims, 11 Drawing Sheets

(51) Int. Cl.
*G01N 29/02* (2006.01)
*H05B 3/14* (2006.01)
*H05B 3/28* (2006.01)
*G02B 5/00* (2006.01)

(52) U.S. Cl.
CPC ............ *H05B 3/148* (2013.01); *H05B 3/283* (2013.01); *G01N 2291/021* (2013.01); *G01N 2291/022* (2013.01); *G02B 5/008* (2013.01); *H05B 2203/032* (2013.01)

(58) Field of Classification Search
CPC ....... G01N 2021/1704; G01N 21/3504; G01N 21/1702; G01N 21/3577; G01N 21/359; H05B 3/148; H05B 3/283; H05B 2203/032; G02B 5/008; G01J 3/42; G01J 3/108; B81B 7/02; B81B 7/0087; B81B 2201/0214; B81B 2201/0292; B81B 2203/0127
See application file for complete search history.

(56) References Cited

U.S. PATENT DOCUMENTS

2014/0291704 A1 10/2014 Ali et al.
2019/0246459 A1 8/2019 Tumpold et al.

OTHER PUBLICATIONS

Bhattacharyya, P., "Technological Journey 1-17, Towards Reliable Microheater Development for MEMS Gas Sensors: A Review", IEEE Transactions on Device and Materials Reliability, IEEE Service Center, Piscataway, NJ, US, vol. 14, No. 2, Jun. 1, 2014, pp. 589-599, XP011550087, ISSN: 1530-4388, DOI: 10.1109/TDMR.2014.2311801.

* cited by examiner

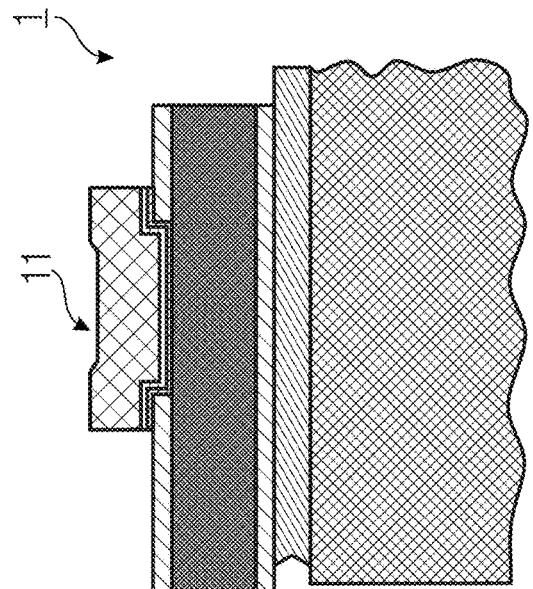
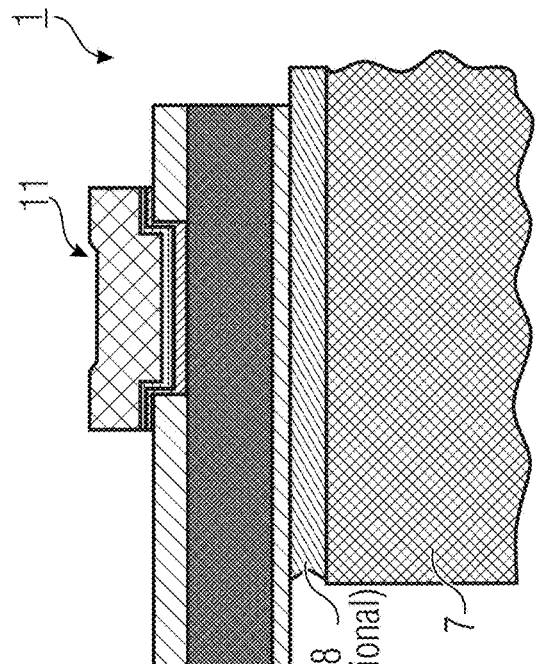
Fig. 5c
Fig. 5d derma# THERMAL EMITTER WITH EMBEDDED HEATING ELEMENT This application claims the benefit of European Patent Application No. 20172220, filed on Apr. 29, 2020, which application is hereby incorporated herein by reference.

TECHNICAL FIELD

Embodiments of the present disclosure relate to an emitter, for example, an infrared emitter with an embedded heating element. The present disclosure further relates to a MEMS infrared radiation source with an embedded heating element and plasmonic structures. Thus, embodiments relate to the technology to provide an infrared (IR) radiation source, i.e. an IR or thermal emitter.

BACKGROUND

The sensing of environmental parameters in the ambient atmosphere, such as noise, sound, temperature and gases, e.g. environmental gas components, gains more and more importance in the implementation of appropriate sensors within mobile devices, home automation such as smart home, and the auto-motive sector. Harmful gas concentrations can occur due to pollution and/or a malfunction of certain devices. However, the well-being of a person or animal is strongly influenced by the air quality. Thus, the gas detection in the environmental atmosphere by inexpensive, always available and connected sensors is an upcoming topic in the future.

In the field of monitoring the air quality in our environment, there are several types of gas-sensing concepts, for example, the non-dispersive infrared (NDIR) sensors, chemical sensors and photo-acoustical sensors (PAS=photoacoustic spectroscopy). A sensor effect often used bases on the excitation of gas molecules in a medium by (infrared) light with a certain wavelength. However, currently available NDIR or PAS systems are relatively expensive due to their complex setups or special components. Further, chemical sensors show a relatively poor selectivity compared to single-wavelength or filter containing optical systems. A typical optical sensor, e.g. a PAS sensor, comprises a radiation source, filter elements for a wavelength selection, a detector and the sample area where the light between the light source and the detector interacts with the environmental medium.

Current thermal emitters for infrared or mid-infrared radiation are usually miniaturized light bulbs or MEMS emitters with metallic heating elements, such as tungsten or platinum. Surface micro-machined or MEMS emitters with metallic heaters are typically limited to operating temperatures below 600° C. to prevent degradation. This results in a significant reduction of the optical output power. Metallic conductors typically have a very low emissivity further resulting in a reduced output. The thermal mass of current emitters is high, causing a slow switching speed thereof. Moreover, the thermal resistance is low which results in a reduced energy efficiency (=less temperature increase per Watt input power).

With the evermore extensive use of gas sensors, there is a particular need to be able to produce such gas sensors having thermal emitters as inexpensively as possible and, thus, cost effectively. However, the resulting reliability and accuracy of the gas sensors should nevertheless be maintained or even increased.

Generally, there is a need in the field of sensors for an approach to provide a thermal emitter, e.g. for a gas sensor or a fluid sensor, having a relatively high thermal resistance (=low thermal mass) for achieving a relatively high energy efficiency (=high optical output power increase per electrical input power increase=high temperature increase per Watt input power) and which can be operated at relatively high operating temperatures.

Such a need can be solved by the thermal emitter according to claim 1. Further, specific implementations of the fluid sensor are defined in the dependent claims.

Accordingly, the present disclosure describes a possible thermal emitter which, for example, may be part of a MEMS gas or fluid sensor that is able to sense simultaneously at least one component of the environmental atmosphere. The thermal emitter for infrared or mid-infrared radiation can be used in any MEMS device having an IR radiation source.

SUMMARY

According to an embodiment, a thermal emitter may comprise a freestanding membrane supported by a substrate, wherein the freestanding membrane comprises in a lateral extension a center section, a conductive intermediate section and a border section, wherein the conductive intermediate section laterally surrounds the center section and is electrically isolated from the center section, the conductive intermediate section comprising a conductive semiconductor material which is encapsulated in an insulating material, and wherein the border section at least partially surrounds the intermediate section and is electrically isolated from the conductive intermediate section, wherein a perforation is formed through the border section.

According to a further embodiment, a MEMS gas or fluid sensor may comprise the above thermal emitter for emitting thermal radiation, a measurement volume having a target gas or target fluid and providing an optical interaction path for the emitted thermal radiation, and an acoustic transducer or a (direct) thermal detector for providing a detector output signal based on the optical interaction of the emitted thermal radiation with the target gas or target fluid in the measurement volume.

Further embodiments are described in the dependent claims.

BRIEF DESCRIPTION OF THE DRAWINGS

In the following, embodiments will be described in the following while making reference to the accompanying drawings in which:

FIG. 5c shows a schematic cross-sectional partial view of a thermal emitter with at least partially exposed plasmonic structures according to an embodiment;

FIG. 5d shows a schematic cross-sectional partial view of a thermal emitter with a plasmonic resonator according to an embodiment;

Figure 1A:
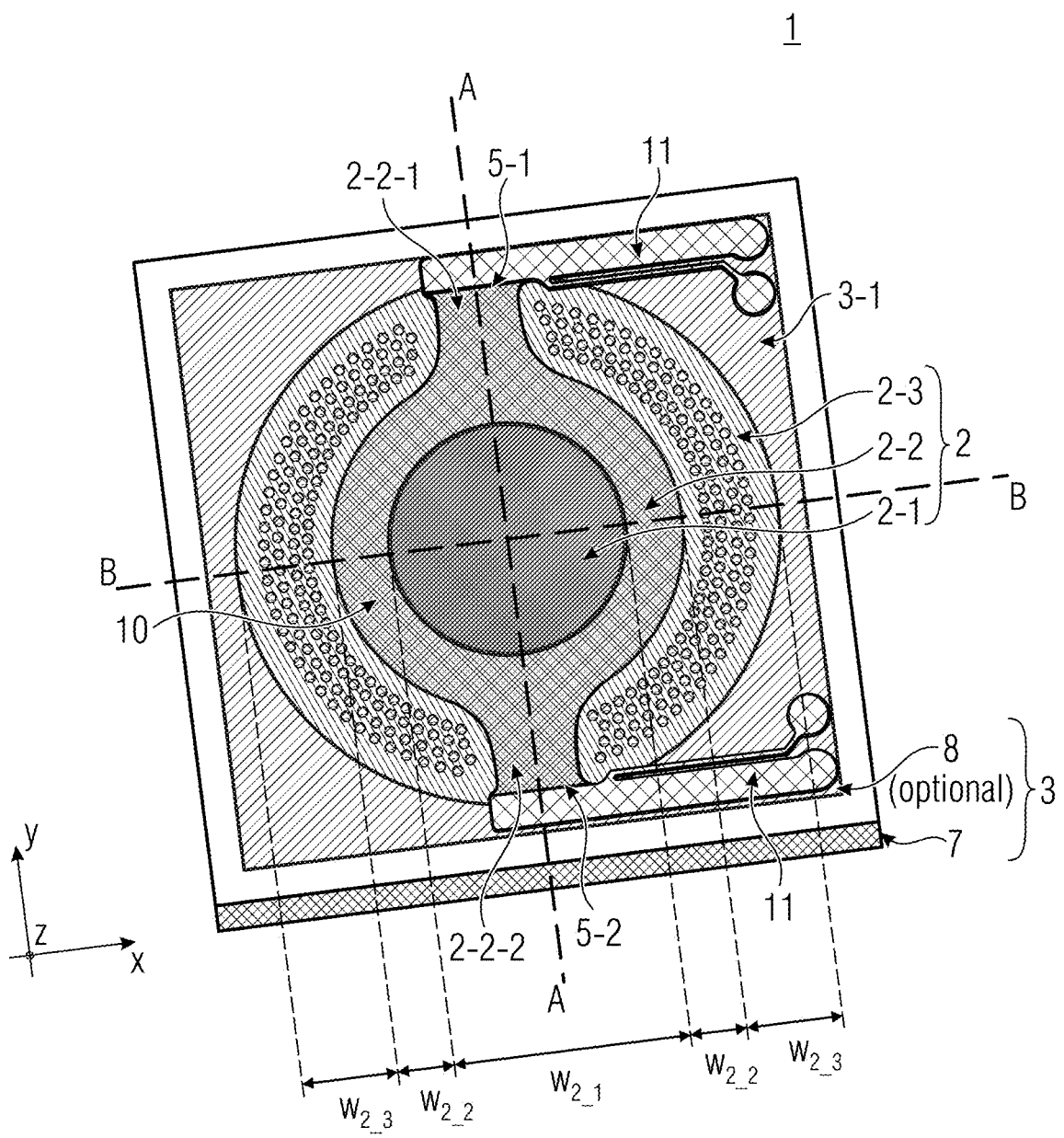
FIG. 1a shows a schematic top 3D view of a thermal emitter according to an embodiment.

Before discussing the present embodiments in further detail using the drawings, it is pointed out that in the figures and the specification identical elements and elements having the same functionality and/or the same technical or physical effect are usually provided with the same reference numbers or are identified with the same name, so that the description of these elements and of the functionality thereof as illustrated in the different embodiments are mutually exchangeable or may be applied to one another in the different embodiments.

DETAILED DESCRIPTION OF ILLUSTRATIVE EMBODIMENTS

In the following description, embodiments are discussed in detail, however, it should be appreciated that the embodiments provide many applicable concepts that can be embodied in a wide variety of a thermal emitter. The specific embodiments discussed are merely illustrative of specific ways to implement and use the present concept, and do not limit the scope of the embodiments. In the following description of embodiments, the same or similar elements or elements that have the same functionality are provided with the same reference sign or are identified with the same name, and a repeated description of elements provided with the same reference number or being identified with the same name is typically omitted. In the following description, a plurality of details is set forth to provide a more thorough explanation of embodiments of the disclosure.

However, it will be apparent to one skilled it the art that other embodiments may be practiced without these specific details. In other instances, well-known structures and devices are shown in block diagram form rather than in detail in order to avoid obscuring examples described herein. In addition, features of the different embodiments described herein may be combined with each other, unless specifically noted otherwise.

It is understood that when an element is referred to as being "connected" or "coupled" to another element, it may be directly connected or coupled to the other element, or intermediate elements may be present. Conversely, when an element is referred to as being "directly" connected to another element, "connected" or "coupled," there are no intermediate elements. Other terms used to describe the relationship between elements should be construed in a similar fashion (e.g., "between" versus "directly between", "adjacent" versus "directly adjacent", and "on" versus "directly on", etc.).

For facilitating the description of the different embodiments, the figures comprise a Cartesian coordinate system x, y, z, wherein the x-y-plane corresponds, i.e. is parallel, to a first main surface region of a substrate (=a reference plane=x-y-plane), wherein the direction vertically up with respect to the reference plane (x-y-plane) corresponds to the "+z" direction, and wherein the direction vertically down with respect to the reference plane (x-y-plane) corresponds to the "−z" direction. In the following description, the term "lateral" means a direction parallel to the x- and/or y-direction, i.e. parallel to the x-y-plane, wherein the term "vertical" means a direction parallel to the z-direction.

In the following description, a thickness of an element usually indicates a vertical dimension of such an element. In the figures, the different elements are not necessarily drawn to scale. Thus, the thicknesses of certain elements, for example thicknesses of the freestanding membrane, the semiconductor substrate, the insulating layer, the heavily doped semiconductor layer and/or the disc-shaped heat spreader structure may not be drawn to scale.

FIG. 1a shows a schematic top 3D (=three dimensional) view of a thermal emitter 1 according to an embodiment. In FIG. 1a, the drawing plane is essentially parallel to the x-y-plane. The thermal emitter 1 comprises a freestanding membrane 2 supported by a substrate 3, wherein the freestanding membrane 2 comprises in a lateral extension a center section 2-1, a conductive (=electrically conductive) intermediate section 2-2 and a border section 2-3, wherein the conductive intermediate section 2-2 laterally surrounds the center section 2-1 and is electrically isolated from the center section 2-1. The conductive intermediate section 2-2 comprises a conductive (=electrically conductive) semiconductor material which is encapsulated in an insulating material. The border section 2-3 at least partially surrounds the intermediate section 2-2 and is electrically isolated from the conductive intermediate section 2-2, wherein a perforation 4 is formed through the border section 2-3.

In other words, the free standing membrane 2 supported by the substrate 3 may be segmented (=partitioned) into three sections, the (inner) center section 2-1, the conductive intermediate section 2-2 and the (outer) border section 2-3, which, for example, are supported by a substrate 3 (e.g. arranged on or at a substrate). According to an embodiment, the border section 2-3 may be mechanically bonded to the substrate 3, wherein the center section 2-1, the intermediate section 2-2 and at least partially the border section 2-3 of the freestanding membrane 2 are arranged on a cavity 6 (see FIG. 2) in the substrate 3.

The center section 2-1 and the boarder section 2-3 may comprise one layer or a plurality of layers. In case of a plurality of layers, the layers of the center section 2-1 may comprise the same material or, alternatively, a different material, for example. The same applies to the border section 2-3. The intermediate section 2-2 may comprise a plurality of layers, for example, at least two layers, such that, for example, a conductive semiconductor layer is encapsulated in an insulating material layer.

Thus, the freestanding membrane 2 is divided in at least three sections, i.e. the center section 2-1, the conductive intermediate section 2-2 and the border section 2-3, and is supported by the substrate 3. As the conductive intermediate section 2-2 is encapsulated (=passivated) in an insulating material, the conductive intermediate section 2-2 is electrically insulated from the center section 2-1 and the border section 2-3. The substrate 3 may comprise a bulk semiconductor substrate 7 and an optional insulating layer 8, wherein the insulating layer 8 may form a main surface region 3-1 of the substrate 3 to which the freestanding membrane 2 is mechanically attached. Further, the insulating layer 8 may comprise an opening 8-1 for at least partially or completely exposing the cavity 6 from the backside (see FIG. 2).

Based on the construction of the thermal emitter 1, such a radiation source, e.g. for a gas sensor or fluid sensor, can provide from the system side a number of requirements, such as a small and compact size, low cost, high radiation output, high energy efficiency, high switching speed, high lifetime and bandwidth. As the thermal emitter 1 has a relatively high thermal resistance (=low thermal mass) a relatively high energy efficiency (=high temperature increase per Watt input power) can be achieved, wherein the thermal emitter 1 can be operated at relatively high operating temperatures due to his specific setup.

Figure 3A:
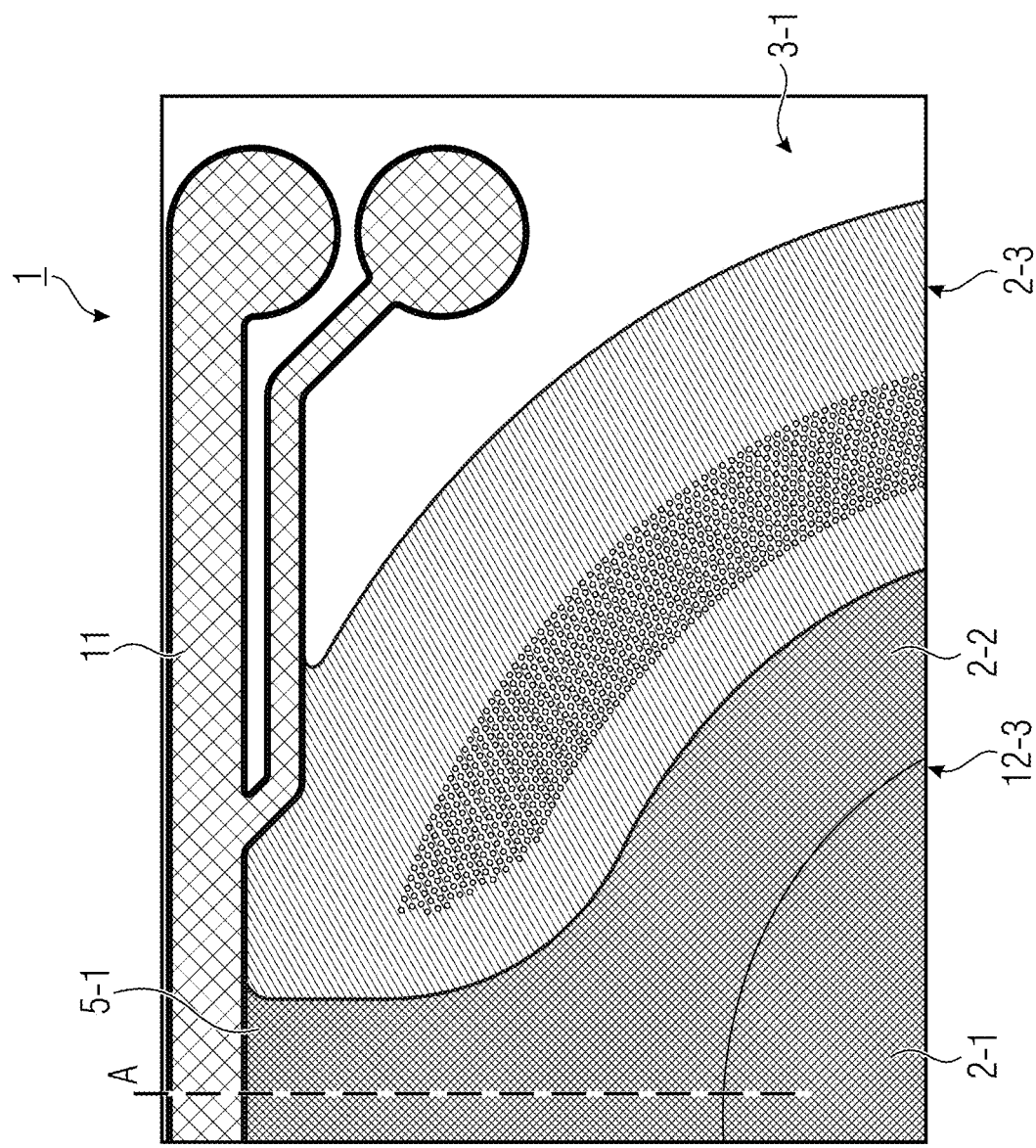
FIG. 3a shows a schematic top partial view of a thermal emitter according to an embodiment.
Figure 3B:
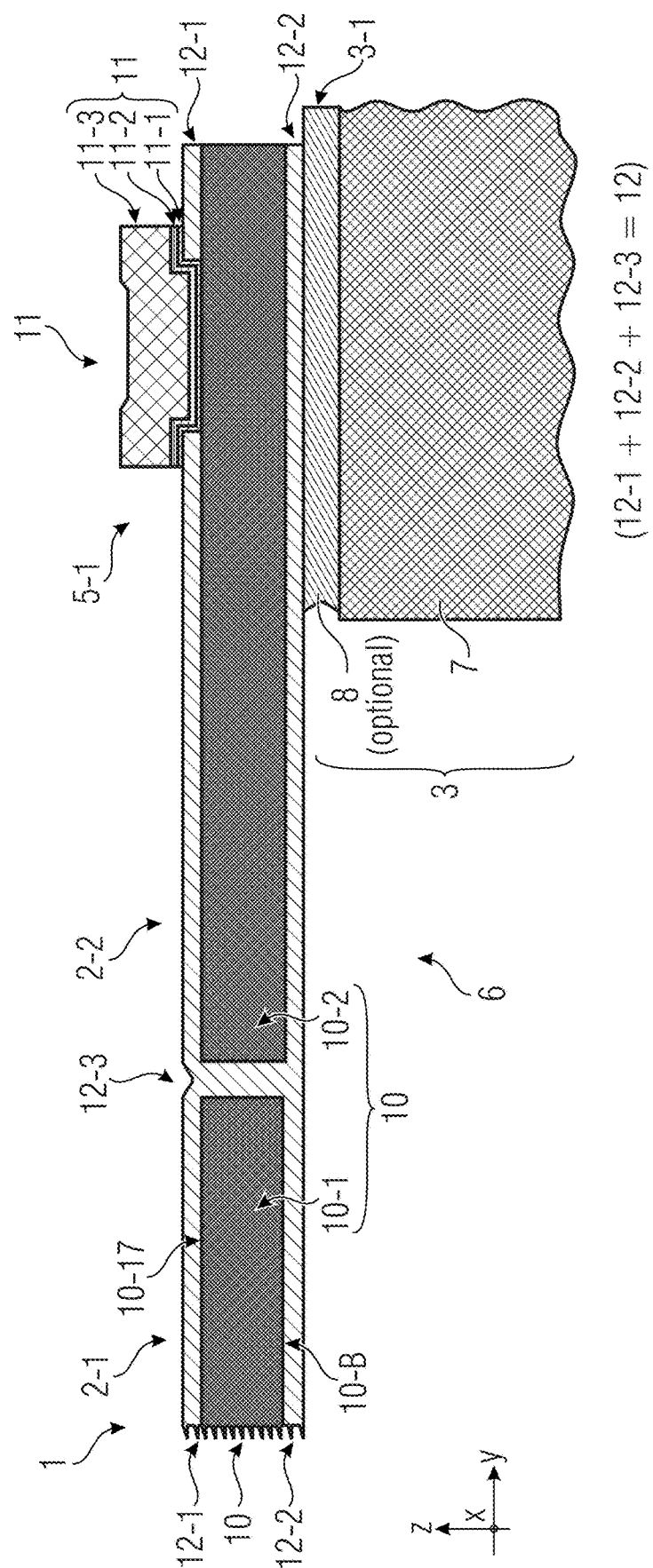
FIG. 3b shows a schematic cross-sectional partial view of a thermal emitter along a dashed intersection line A of the thermal emitter of FIG. 3a according to an embodiment.
Figure 4A:
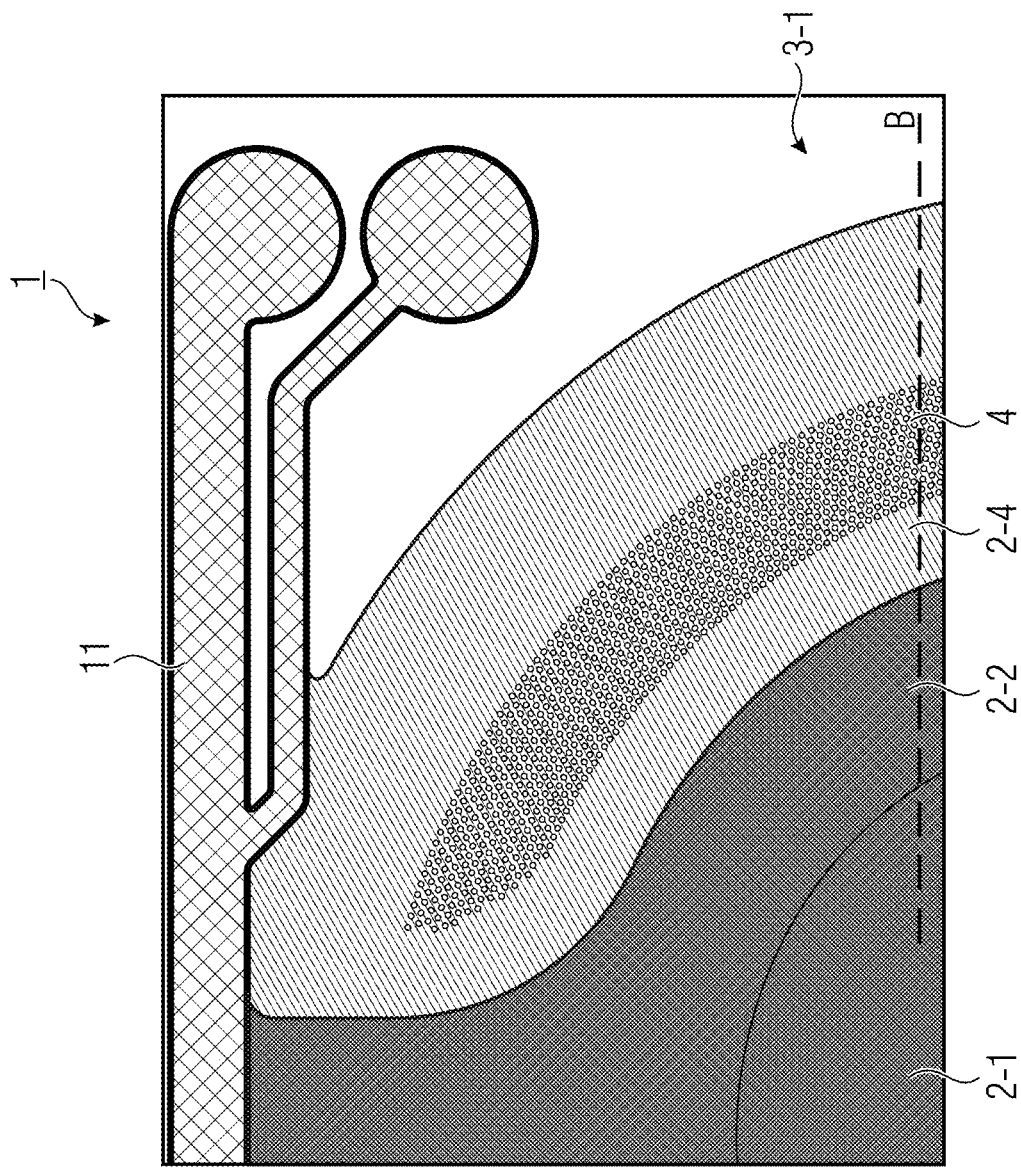
FIG. 4a shows a schematic top partial view of a thermal emitter according to an embodiment.
Figure 4B:
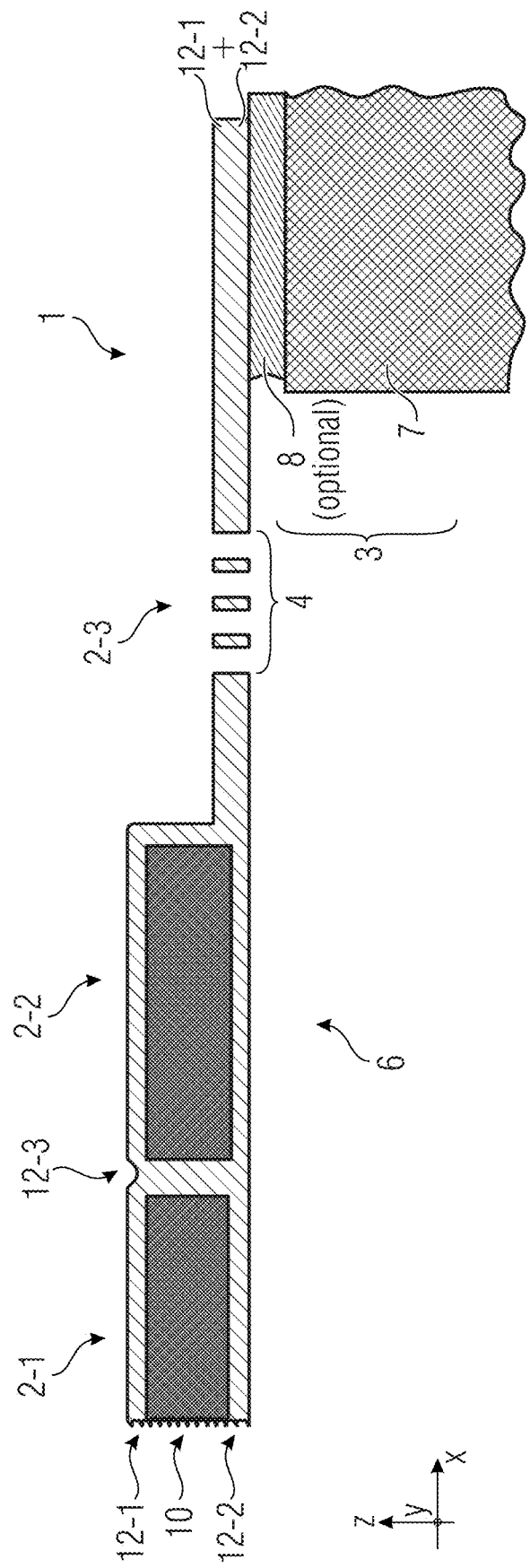
FIG. 4b shows a schematic partial cross-sectional view of a thermal emitter along a dashed intersection line B of the thermal emitter of FIG. 4a according to an embodiment.
Figure 5A:
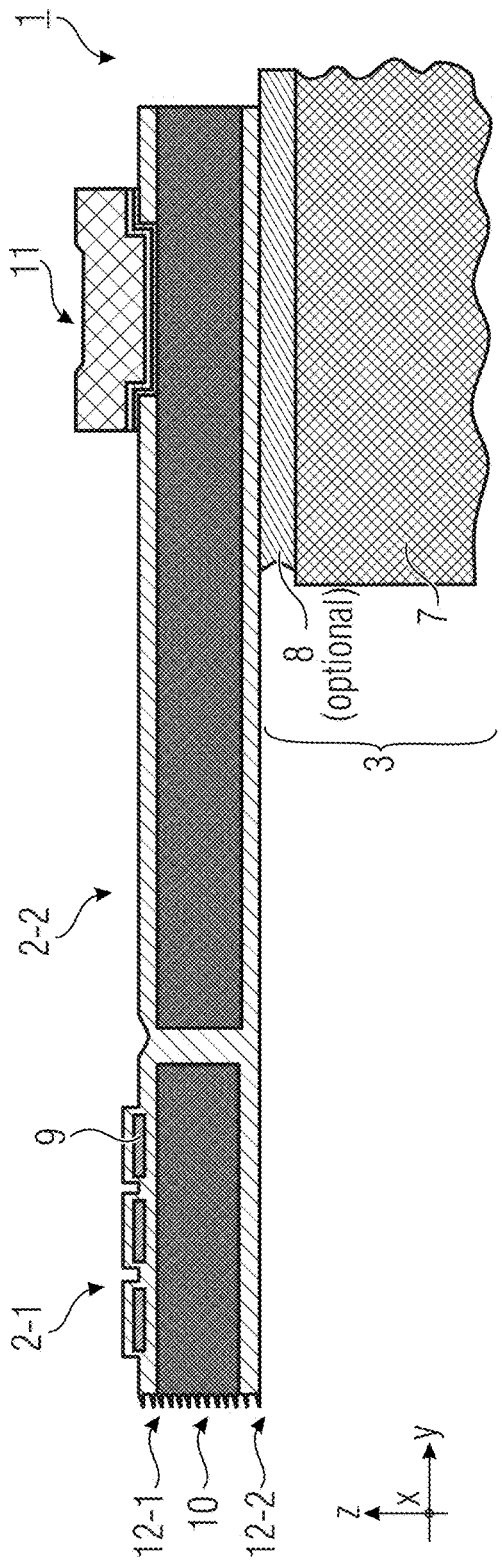
FIG. 5a shows a schematic cross-sectional partial view of a thermal emitter with fully embedded plasmonic structures according to an embodiment.
Figure 5B:
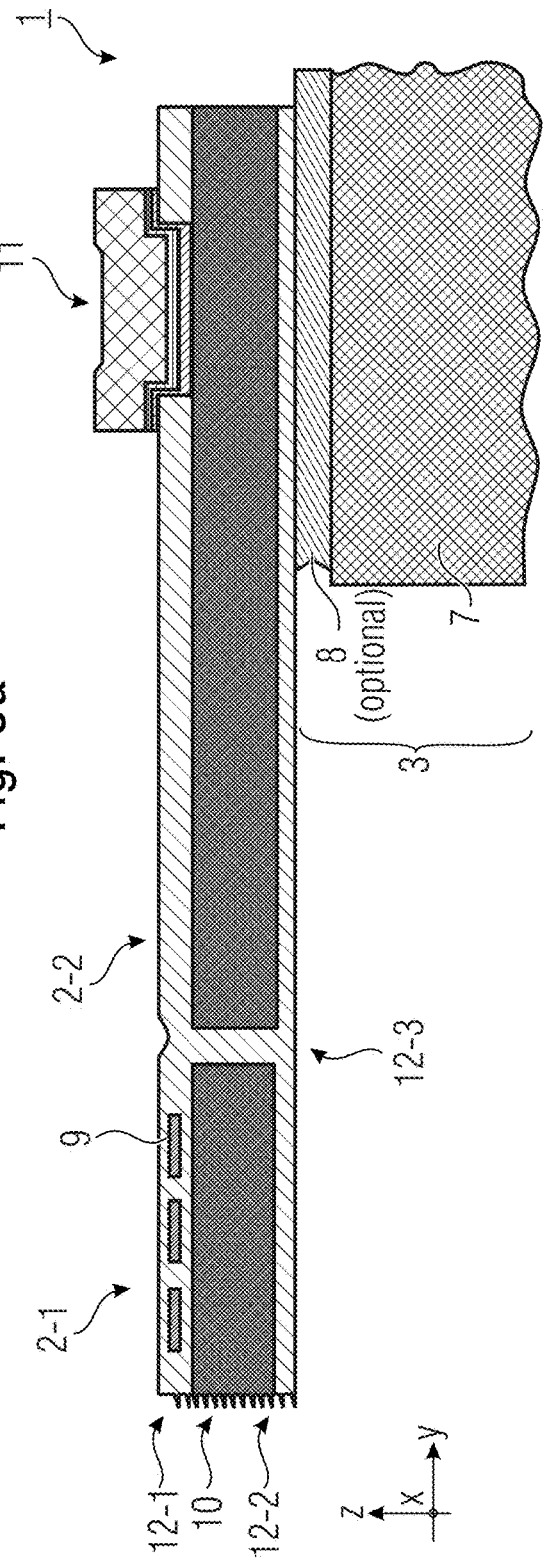
FIG. 5b shows a schematic cross-sectional partial view of a thermal emitter with partially embedded plasmonic structures according to an embodiment.

According to an embodiment, the freestanding membrane 2 of the thermal emitter 1 may extend as a layer stack parallel to a main surface region 3-1 of the substrate 3, wherein the layer stack may comprise a conducting semiconductor layer which is encapsulated in an insulating layer having the insulating material (see also FIGS. 3b, 4b, 5b, for example). In other words, the layer stack forming the conductive intermediate section 2-2 parallel to the main surface region 3-1 of the substrate 3 may comprise a plurality of layers, for example, at least two layers. The conductive intermediate section 2-2 may comprise an electrically conducting semiconductor layer which is encapsulated in the insulating layer in form of an insulating encapsulation layer, wherein the electrically conducting semiconductor layer provides a current path, which is heated up to the operating temperature, during an electrical activation of the thermal emitter 1, and wherein the insulating encapsulation layer provides electrical insulation to the adjacent environment and elements and provides a high thermal conductivity for the heat generated by the conducting semiconductor layer to the environment.

According to an embodiment, the conductive intermediate section 2-2 forms a branched current path separated by the center section 2-1. As exemplarily shown in FIG. 1a, the conductive intermediate section 2-2 may form a ring-shaped heating element, that produces during an activated state (=electrical energization of the intermediate section 2-2) heat that may also spread into/through the center section 2-1. Thus, the center section 2-1 and the intermediate section 2-2 may together form a resulting heating structure or heating element for emitting or dissipating heat in form of thermal (e.g. infrared) radiation, e.g. into a measurement cavity. Thus, the heated ring-shaped conductive intermediate section 2-2 may provide for a relatively uniform temperature profile in the heating structure.

According to a further embodiment, the conductive intermediate section 2-2 may also comprise one of a circle, square, oval and ellipse shape (or any convex polygon shape), wherein this list of shapes of the conductive intermediate section 2-2 is not to be regarded as exhaustive.

According to an embodiment, the conducting semiconductor layer is for the most part (e.g. at least 80, 90 or 95%) or completely encapsulated (=hermetically sealed or passivated) in the insulating material for preventing an oxidation of the conducting semiconductor layer during an activated state.

According to an embodiment, the conductive intermediate section 2-2 of the freestanding membrane 2 comprises a heavily doped semiconductor layer 10 which is encapsulated in the insulating material. The heavily doped semiconductor layer may comprise a doping concentration in the range between $10^{18}$ and $10^{20}$ doping atoms/cm$^3$ for achieving the electrical conductivity of the material of the heavily doped semiconductor layer of the conductive intermediate section 2-2 in a range between 10 and 1000 S/m. The doping concentration may be chosen to achieve an electrical conductivity of the material of the heavily doped semiconductor (e.g. Si) layer in the range between 250 and 350 S/m and (about) 300 S/m in a cold (=inactivated) state and in the range between 80 and 120 S/m and (about) 100 S/m in a hot (=activated) state of the conductive intermediate section 2-2 of the freestanding membrane 2.

Based on the resulting (e.g. uniformly distributed) electrical conductivity of the material of the heavily doped semiconductor layer of the conductive intermediate section 2-2, an uniform current distribution and, accordingly, an uniform heat distribution resulting in an uniform heat dissipation can be achieved in the conductive intermediate section 2-2.

According to an embodiment, the conductive semiconductor material of the conductive intermediate section 2-2 may comprise poly-silicon or monocrystalline silicon, and the insulating material may comprise silicon nitride. Further materials may be used. To be more specific, the insulating material may comprise, for example, silicon nitride ($Si_xN_y$), silicon oxide ($SiO_2$), silicon oxynitride ($Si_2N_2O$), plastic (e.g. polymers) or ceramic, e.g. $Al_2O_3$ for an operation under harsh conditions. However, this list of insulating materials for covering the conducting semiconductor layer is not to be regarded as exhaustive. The conductive semiconductor material may comprise, for example, silicon (Si), such as poly-silicon (poly-Si), amorphous silicon (a-Si), or monocrystalline silicon, gallium nitride (GaN), gallium arsenide (GaAs) or aluminum nitride (AlN). However, this list of materials for the conducting semiconductor layer is not to be regarded as exhaustive.

According to an embodiment, the conductive intermediate section 2-2 of the freestanding membrane extends between at least two edge regions 5-1, 5-2 . . . 5-n of the freestanding membrane 2. As shown in FIG. 1a, the laterally opposing edge regions 5-1, 5-2 may traverse or bridge the border section 2-3 to reach a respective wiring structure or contact pad 11. The wiring structure 11 may be arranged to provide a bonding area for an external electrical connection, e.g. by means of bond wires, to a control and/or supply unit. The wiring structure 11 may comprise a copper, aluminum, tungsten, gold, platinum and/or titanium material or a layered stack of at least two of these materials for providing a low contact resistance.

According to a further embodiment, the conductive intermediate section 2-2 may comprise n conductor arms or extensions 2-2-n, with n is an integer and n 2, between the at least two edge regions 5-1, 5-2 . . . 5-n of the freestanding membrane 2. Thus, a Y-shaped conductive intermediate section 2-2 has n=3 arms (e.g. two input arms and one output arm or vice versa), an X-shaped conductive intermediate section 2-2 has n=4 arms (e.g. two input arms and two output arm or vice versa), etc., for example. The plurality of arms 2-2-n of the conductive intermediate section (2-2) and the associated edge regions 5-n of the freestanding membrane 2 may be arranged symmetrically with respect to a center or symmetry line, e.g. AA or BB, through the center point of the center section 2-1. The plurality of arms 2-2-n and the edge regions 5-n may be arranged with an angular offset or difference C, with C=360°/n.

According to an embodiment, the perforation 4 in the border region 2-3 forms a ventilation hole or a plurality of ventilation holes in the freestanding membrane. The perforation 4 forms a ventilation path through the border section 2-3. The ventilation hole(s) of the perforation 4 allows a gas or fluid ventilation between the environmental atmospheres at both sides (i.e. adjacent to the main surface regions 2-A, 2-B) of the freestanding membrane 2. Thus, an atmospheric pressure difference between the environmental atmospheres at both sides of the freestanding membrane 2 can be leveled out or balanced.

Moreover, the ventilation holes of the perforation 4 together with the insulation material 12 of the border section 2-3 allow a thermal isolation or thermal decoupling of the heating structure, i.e. of the intermediate section 2-2 and the adjacent center section 2-1, of the freestanding membrane 2 from the substrate 2 (=bulk-Si) avoiding the substrate 2 to act as a heat sink. The ventilation and thermal isolation functionality of the border section 2-3 of the freestanding membrane 2 is very effective, as the freestanding membrane 2 may be arranged on a cavity in the substrate 3, i.e. the freestanding membrane 2 may span a cavity in the substrate 3 (see FIG. 2).

According to an embodiment, the center section 2-1 of the freestanding membrane is a disc-shaped heat spreader structure having a highly thermal conductive material with a thermal conductivity κ≥30 W/m*K, e.g. at 298° C.

In case, the center section 2-1 is sufficiently thermally coupled to the intermediate section 2-2, a highly thermal conductive material of the center section 2-1 allows a nearly uniform heat distribution in the center section 2-1 and, thus, a nearly uniform heat dissipation of the conductive intermediate section 2-2 together with the center section 2-1 during an activated state (=electrical energization of the intermediate section 2-2), wherein the achieved temperature (heat) only slightly decreases in the center section 2-1. The center section 2-1 may comprise a semiconductor material, e.g. silicon, or a metal. For example, bulk-silicon has a thermal conductivity of κ≥148 W/m*K at 298° C., poly-silicon has a thermal conductivity of κ≥30 W/m*K at 298° C., aluminum has a thermal conductivity of κ≥237 W/m*K at 293° C., copper has a thermal conductivity of κ≥401 W/m*K at 293° C., gold has a thermal conductivity of κ≥315 W/m*K at 300° C., and tungsten has a thermal conductivity of κ≥173 W/m*K at 293° C.

Typically, the heat spreader structure 2-1 has a disc-shaped or a square-shaped form. However, other structures, e.g. with a perforation or recess, are possible. The shape of the heat spreader structure 2-1 may generally depend on the shape of the membrane itself. Thus, as the equi-temperature lines (=same radius) may be adapted to have the same thermal boundary conditions arising from the membrane clamping, disc-shaped membranes may be used, which have no edges with different thermal boundary conditions.

Moreover, the outer circumferential shape (contour) of the heat spreader structure 2-1 is usually adapted to the inner circumferential shape of the conductive intermediate section 2-2, wherein both elements are arranged in a minimal lateral distance (e.g. 1 to 5 μm) to achieve the close thermal coupling therebetween. The heat spreader structure 2-1 and the conductive intermediate section 2-2 are usually separated by an insulating segmentation, which may comprise a dielectric material.

According to an embodiment, the thermal emitter forms a MEMS IR emitter having an operating temperature in the range between 800 to 1100° C.

According to an embodiment, the thermal emitter 1 may be implemented by a layer stack of a surface micro-machined IR emitter (MEMS emitter) with a freestanding membrane 2 and an encapsulation (=passivation), e.g. a $Si_xN_y$ layer, to prevent oxidation of the conductive intermediate section 2-2 with the heating layer having a poly-silicon or a monocrystalline silicon material. A possible material for the conductive intermediate section 2-2 is heavily-doped (poly-)silicon, which allows to operate the thermal emitter 1 at high temperatures, e.g. ~1000° C., wherein the radiated output "$P_{out}$" (=emitted power) of the thermal emitter 1 depends on the generated temperature "T" in the conductive intermediate section 2-2 and the heat spreader structure 2-1 by the power of 4:

$$P_{out} \approx T^4$$

Based on the described construction of the thermal emitter 1, e.g. based on MEMS technology, such a radiation source, e.g. for a gas sensor, can provide from the system side a number of requirements, such as a small and compact size, low cost, high radiation output, high energy efficiency, high switching speed, high lifetime and bandwidth. The thermal emitter 1 may be arranged with a silicon microphone technology, so that such a thermal emitter system may have very low thermal mass due to a reduced thickness of the conductive intermediate section 2-2. This also results in a high thermal resistance. As the thermal emitter 1 has a relatively high thermal resistance (=low thermal mass) a relatively high energy efficiency (=high temperature increase per Watt input power) and a high switching speed can be achieved, wherein the thermal emitter 1 can be operated at relatively high operating temperatures due to his specific setup.

Using poly-Si as the heater material, the reliability at high operating temperatures can be increased, wherein the thermal emitter 1, i.e. the conductive intermediate section 2-2, may be less prone to the electromigration effect compared to metal.

Further, FIG. 1a shows some exemplary lateral dimensions of the different elements of the freestanding membrane 2 parallel to the x-axis. The center section 2-1 may comprise a lateral width (diameter) $w_{2-1}$ between 100 and 1600 μm, between 200 and 800 μm or between 300 and 600 μm, or of about 400 μm+/−40 μm. The conductive intermediate section 2-2 may comprise a lateral width $w_{2-2}$ between 25 and 400 μm, between 50 and 200 μm or between 75 and 125 μm, or of about 100 μm+/−10 μm. The border section 2-3 may comprise a lateral width $w_{2-3}$ between 25 and 400 μm, between 50 and 200 μm or between 75 and 125 μm, or of about 100 μm+/−10 μm.

According to an embodiment, the border section 2-3 of the freestanding membrane 2 may comprise a semiconductor layer encapsulated in an insulating material or comprises an insulating material layer. According to an embodiment, the center section 2-1 of the freestanding membrane 2 may comprise a semiconductor layer encapsulated in an insulating material or comprises an insulating material layer.

According to an embodiment, the thermal emitter 1 may further comprise a plasmonic structure on the center section 2-1 and the conductive intermediate section 2-2 of the freestanding membrane 2, wherein the plasmonic structure is at least partially encapsulated in the insulating material, and wherein the plasmonic structure forms a bandpass filter for an IR radiation emitted by the freestanding membrane during an operation of the thermal emitter. According to an embodiment, the plasmonic structure may form a plasmonic resonator for the emitted IR radiation.

Figure 1B:
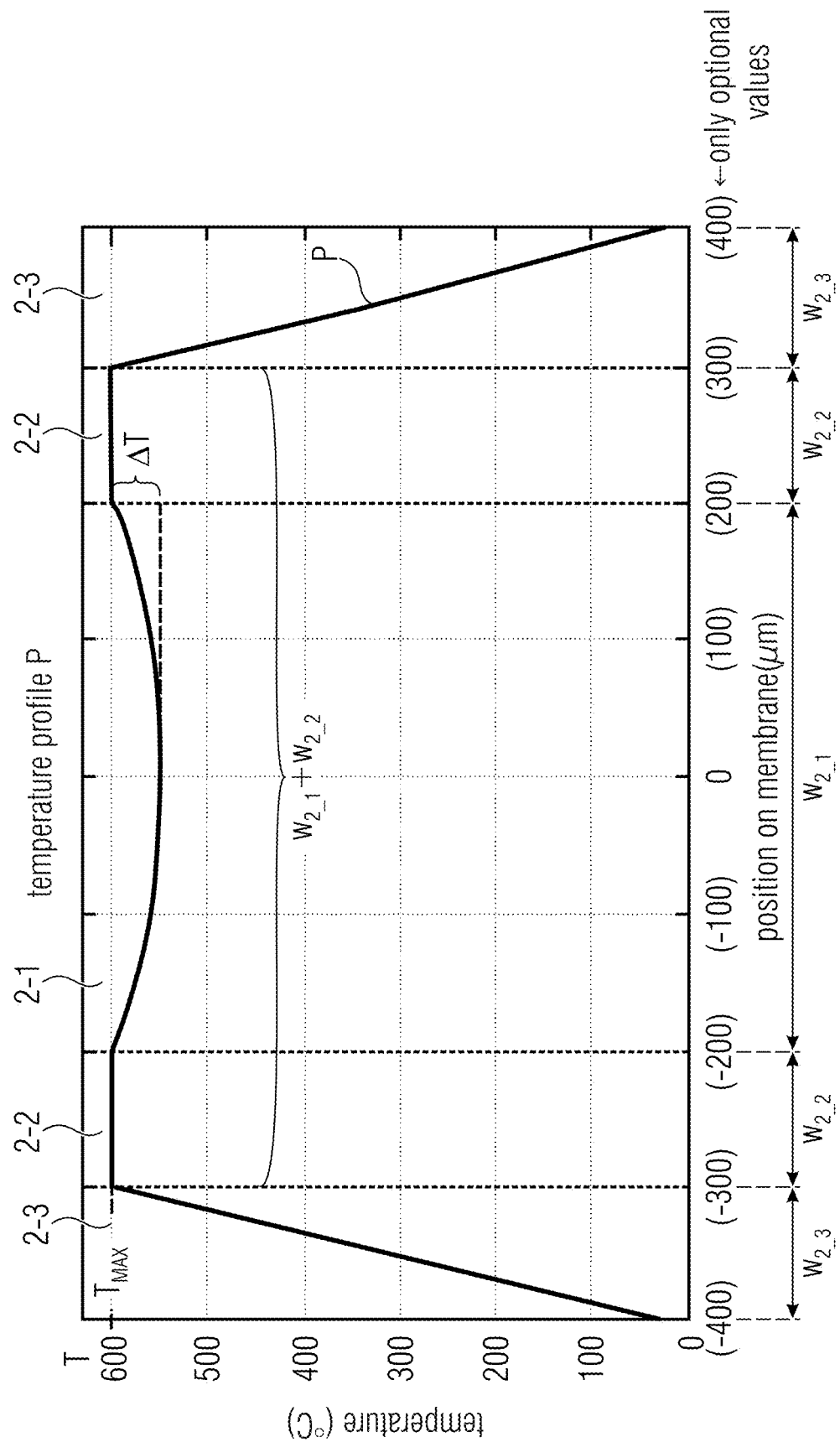
FIG. 1b shows a schematic (lateral) temperature profile of the thermal emitter according to an embodiment.

FIG. 1b shows a schematic (lateral) temperature profile of the freestanding membrane 2 of the thermal emitter 1 according to an embodiment. In FIG. 1b an exemplary temperature profile P belongs to the thermal emitter 1 of FIG. 1a and is associated to the different sections of the freestanding membrane 2 of the thermal emitter 1 during an activated state (=electrical energization of the intermediate section 2-2).

The depicted temperature profile P shows the temperature T (° C.=y-axis) as a function of a distance (x-axis) from the center of the freestanding membrane 2. Accordingly, the temperature profile P may indicate a heat distribution depending on a lateral distance from the conductive intermediate section 2-2.

As shown in FIG. 1b, the temperature profile P stems from the ring-shaped conductive intermediate section 2-2 (=heating element). The highest temperature $T_{MAX}$ may be reached at the ring portion of the heating element 2-2 while the temperature T may slightly decrease by ΔT towards the center portion of the freestanding membrane 2, i.e. inside the disc-shaped center section 2-1. In the center section 2-1, the temperature T lies within a temperature range ΔT, wherein ΔT depends on the thermal conductivity of the material of the center section 2-1, i.e. the higher is the thermal conductivity of the material of the center section 2-1 the smaller is ΔT. Based on the construction of the thermal emitter 1, the temperature decrease ΔT may be less than 15, 10 or 5% of the temperature $T_{MAX}$ at the ring portion of the heating element 2-2. Furthermore, the temperature T may rapidly drop with decreasing lateral distance from the ring-shaped conductive intermediate section 2-2 towards the peripheral portions of the freestanding membrane 2, i.e. in the border section 2-3.

The thermal isolation functionality of the border section 2-3 of the freestanding membrane 2 allows, to a large extent, a thermal decoupling of the intermediate section 2-2 of the freestanding membrane 2 from the substrate 2 (e.g. bulk-Si) which results in the rapid drop of the temperature T in the border section 2-3 having the perforation 4 in the insulation material 12.

At the time of activation of the intermediate section 2-2 of the thermal emitter 1, heat (increased temperature T) is produce in the intermediate section 2-2 and spreads into the thermally conductive center section 2-1. This heat (about TMAX) may be emitted or dissipated by the conductive intermediate section 2-2 and the center section 2-1 in form of thermal (e.g. infrared) radiation.

Figure 2:
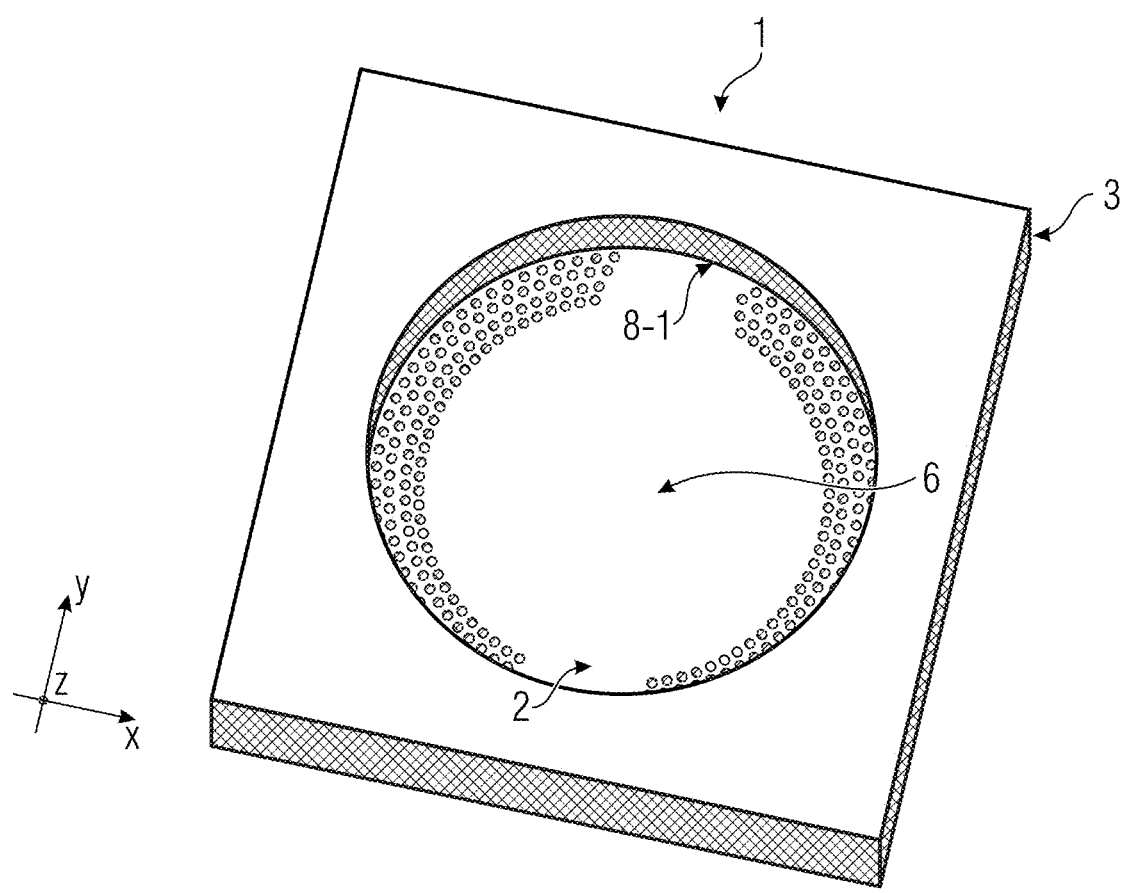
FIG. 2 shows a schematic bottom 3D view of the thermal emitter according to an embodiment.

FIG. 2 shows a schematic bottom 3D view of the thermal emitter 1. According to an embodiment the center section 2-1, the intermediate section 2-2 and at least partially the border section 2-3 of the freestanding membrane 2 may be arranged on a cavity or recess 6 in the substrate 3. Further, the freestanding membrane 2 may cover the cavity 6 in the substrate 3, wherein the border section 2-3 of the freestanding membrane 2 is attached to the substrate 3. The substrate 3 may, for example, comprise the bulk semiconductor substrate 7, e.g. bulk-Si.

In the following, a number of different possible implementations of the thermal emitter 1 are exemplarily described. In the present description of embodiments, the same or similar elements having the same structure and/or function are provided with the same reference numbers or the same name, wherein a detailed description of such elements will not be repeated for every embodiment. Thus, the above description with respect to FIGS. 1a-b and 2 and is equally applicable to the further embodiments as described below. In the following description, essentially the differences, e.g. additional elements, to the embodiment as shown above and the technical effect(s) resulting therefrom are discussed in detail.

FIG. 3a shows a schematic top partial view of a thermal emitter 1, wherein FIG. 3b shows a schematic cross-sectional partial view of a thermal emitter 1 along a dashed intersection line A of the thermal emitter of FIG. 3a. The intersection line A is parallel to the y-axis.

According to an embodiment of the thermal emitter 1, the center section 2-1 of the freestanding membrane 2 may comprise a first portion 10-1 of the semiconductor layer 10 encapsulated in an insulating material 12. Moreover, the conductive intermediate section 2-2 of the freestanding membrane 2 may comprise a second portion 10-2 of semiconductor layer 10 encapsulated in an insulating material 12. The insulating material 12 may comprise a first and a second insulating material layer 12-1, 12-2, wherein the first insulating material layer 12-1 is arranged on the first main surface region 10-A of the semiconductor layer 10, wherein the second insulating material layer 12-2 is arranged on the second main surface region 10-B of the semiconductor layer 10, and wherein a dielectric segmentation line 12-3 of the insulating material 12 is arranged laterally between the first and second portion 10-1, 10-2 of the semiconductor layer 10 for electrically separating the two portions.

Moreover, the border section 2-3 of the freestanding membrane 2 may comprise a third portion 10-3 of semiconductor layer 10 encapsulated in the insulating material 12 or may comprise an insulating material layer 12-2. Optionally, a further dielectric segmentation line 12-3 of the insulating material 12 may arranged laterally between the second portion and third 10-2, 10-3 of the semiconductor layer 10 for electrically separating the two portions (in case, the third portion 10-3 is present).

At least the second portion 10-2 of semiconductor layer 10 is heavily doped. Optionally, the first and third (optional) portions 10-1, 10-3 of semiconductor layer 10 are also heavily doped.

Thus, the freestanding membrane 2 of the thermal emitter 1 may extend as a layer stack comprising the (portions 10-1, 10-2 and optional 10-3 of the) semiconductor layer 10 between the first and a second insulating material layer 12-1, 12-2 of the insulating material 12.

The insulating material 12 may form a passivation of the (portions 10-1 and/or 10-2 of the) semiconductor layer 10 (=the heating element) of the freestanding membrane 2. The heating element itself might be integrated into the freestanding membrane (=carrier membrane) 2 resulting in improved thermal properties of the thermal heater 1.

As shown in FIGS. 3a-3b, the wiring structure 11 is arranged at the edge region 5-1 of the freestanding membrane 2 to provide a bonding area for an external electrical connection, e.g. by means of bond wires, to a control and/or supply unit, for example. The wiring structure 11 may comprise a gold, platinum and/or titanium material or a layered stack of at least two of these materials for providing a low contact resistance. As exemplarily shown in FIG. 3b, the wiring structure 11 may comprise a metal layer stack comprising a Ti layer 11-1 on the second portion 10-2 of semiconductor layer 10 of the conductive intermediate section 2-2, a Pt layer 11-2 on the Ti layer 11-1, and an Au layer 11-3 on the Pt layer 11-2.

As the center section 2-1 is thermally coupled to the intermediate section 2-2, a highly thermal conductive material of the center section 2-1 allows a nearly uniform heat distribution in the center section 2-1 and, thus, a nearly uniform heat dissipation of the conductive intermediate section 2-2 together with the center section 2-1 during an activated state (=electrical energization of the intermediate section 2-2).

As shown in FIGS. 3a-3b, the substrate 3 may comprise a bulk semiconductor substrate 7 and an optional insulating layer 8 to which the freestanding membrane 2 is mechanically attached. According to a further embodiment, the optional insulating layer 8 may be omitted, wherein the second insulating material layer 12-2 of the freestanding membrane may also be directly connected to the semiconductor substrate 7.

As shown in FIGS. 3a-3b, the semiconductor layer 10 (and it's portions 10-1, 10-2, optional 10-3) may comprise a (vertical) thickness d10 between 200 and 2000 nm, between 400 and 1300 nm or between 500 and 800 nm, or of about 660 nm+/−60 nm (=between 600 and 720 nm). Alternatively, the semiconductor layer 10 may comprise a (vertical) thickness d10 between 80 and 1200 nm, between 160 and 700 nm or between 250 and 400 nm, or of about 330 nm+/−30 nm (=between 300 and 360 nm).

The insulating material layers 12-1, 12-2 may each comprise a (vertical) thickness $d_{12}$ between 50 and 400 nm, between 100 and 300 nm or between 120 and 160 nm, or of about 140 nm+/−10 nm (=between 130 and 150 nm).

The insulating layer 8 may comprise a (vertical) thickness $d_8$ between 500 and 8000 nm, between 1000 and 4000 nm or between 1800 and 2600 nm, or of about 2200 nm+/−200 nm (=between 2000 and 2400 μm).

The bulk substrate 7 each comprise a (vertical) thickness d7 between 50 and 1000 μm, between 100 and 750 μm or between 200 and 300 μm, or of about 250 μm+/−25 μm (=between 225 and 275 μm).

Contact pad 11 may comprise a metal layer stack having the Ti layer 11-1 with a (vertical) thickness $d_{11-1}$ of about 400 nm+/−40 nm, the Pt layer 11-2 with a (vertical) thickness $d_{11-2}$ of about 100 nm+/−10 nm, and the Au layer 11-3 with a (vertical) thickness $d_{11-3}$ of about 50 nm+/−5 nm.

The above values and/or value ranges are equally applicable to the further embodiments described herein.

FIG. 4a shows a schematic top partial view of a thermal emitter 1, wherein FIG. 4b shows a schematic cross-sectional partial view of a thermal emitter 1 along a dashed intersection line B of the thermal emitter of FIG. 4a. The intersection line A is parallel to the x-axis.

As shown in FIGS. 4a-4b, the border section 2-3 of the freestanding membrane 2 may comprise the combined insulating material layers 12-1 and 12-2 having the perforation 4 for providing the ventilation and thermal isolation functionality.

As shown in FIGS. 4a-4b, the substrate 3 may comprise a bulk semiconductor substrate 7 and an optional insulating layer 8 to which the freestanding membrane 2 is mechanically attached. According to a further embodiment, the optional insulating layer 8 may be omitted, wherein the second insulating material layer 12-2 of the freestanding membrane may also be directly connected to the semiconductor substrate 7. Thus, the border section 2-3 of the freestanding membrane 2 may only comprise the insulating material 12, e.g. the insulating material layers 12-1 and 12-2.

FIG. 5a shows a schematic cross-sectional partial view of a thermal emitter 1 with fully embedded plasmonic structures 9. The arrangement of the thermal emitter 1 of FIG. 5a differs from the arrangement of the thermal emitter 1 of FIG. 3b in that the thermal emitter 1 comprises a plasmonic structure 9 on the center section 2-1 and/or optionally on the conductive intermediate section 2-2 of the freestanding membrane 2, wherein the plasmonic structure 9 is completely encapsulated or enclosed in the insulating material 12, e.g. in the first insulating material layer 12-1. According to an embodiment, the plasmonic structure 9 may form a bandpass filter or a plasmonic resonator for the IR radiation emitted by the freestanding membrane 2 during operation of the thermal emitter 1.

The plasmonic structure 9 may comprise plasmonic materials (metals or metal-like materials or dielectric materials) that exhibit negative real permittivity, for example, gold, silver or silicon.

The thermal emitter 1 may emit light as a black body emitter with a broad emission spectrum, for example, between 0.25 μm and 3 μm. Including plasmonic structures 9, for example, at the heating element (=the center section 2-1 and/or the conductive intermediate section 2-2 of the freestanding membrane 2) may provide an enhancement of the radiation in a desired range of wavelengths. Accordingly, the thermal emitter 1 may be configured to emit thermal radiation, e.g. infrared radiation, in a predetermined wavelength spectrum, e.g. into a measurement cavity of a gas sensor or a fluid sensor. The particular wavelength of the emitted thermal radiation may depend on the gas or fluid to be detected, i.e. the so-called analyte or target gas/fluid.

With the embedding of the plasmonic structure 9 in the insulating material 12, the desorption, the loss of adhesion or the diffusion/alloying of the material of the plasmonic structure 9 into the base material can be prevented. The thermal emitter 1 (heating structure) may be provided with an enhanced emission in the desired range of wavelengths, wherein a long term stability, a long live time, a high efficiency and small chip sizes can be realized.

FIG. 5b shows a schematic cross-sectional partial view of a thermal emitter with partially embedded plasmonic structures. The arrangement of the thermal emitter 1 of FIG. 5b differs from the arrangement of the thermal emitter 1 of FIG. 5a in that the thermal emitter 1 comprises a plasmonic structure 9 on the center section 2-1 and/or optionally on the conductive intermediate section 2-2 of the freestanding membrane 2, wherein the plasmonic structure 9 is partially encapsulated or enclosed in the insulating material 12.

As shown in FIG. 5b, the plasmonic structure 9 may be arranged directly on the center section 2-1 and/or optionally on the conductive intermediate section 2-2 of the freestanding membrane 2. Thus, the plasmonic structure 9 is encapsulated between the insulating material 12 and the respective portion 10-1 and/or 10-2 of the semiconductor layer 10.

FIG. 5c shows a schematic cross-sectional partial view of a thermal emitter with at least partially exposed plasmonic structures 9 according to an embodiment. The arrangement of the thermal emitter 1 of FIG. 5c differs from the arrangement of the thermal emitter 1 of FIGS. 5a-5b in that the thermal emitter 1 comprises a plasmonic structure 9 on the center section 2-1 and/or optionally on the conductive intermediate section 2-2 of the freestanding membrane 2, wherein the plasmonic structure 9 is arranged on the first insulating material layer 12-1 of the insulating material 12 and the far side main surface region 9-A (=averted to the layer 12-1) is at least partially or completely exposed to the environment.

FIG. 5d shows a schematic cross-sectional partial view of a thermal emitter 1 with a plasmonic resonator 9-1 according to a further embodiment. The thermal emitter 1 may comprise a plasmonic structure 9 neighboring to the first main surface region 10-A of the semiconductor layer 10, as shown in any of FIGS. 5a-5c, wherein a reflective layer 9-2 is arranged on the opposite side of the semiconductor layer 10, i.e. neighboring to the second main surface region 10-B of the semiconductor layer 10. The reflective layer 9-2 may comprise a reflective material (e.g. metal) on the bottom side of the membrane 2. A reflective material for plasmonics is typically a low-Ohmic material.

Figure 6A:
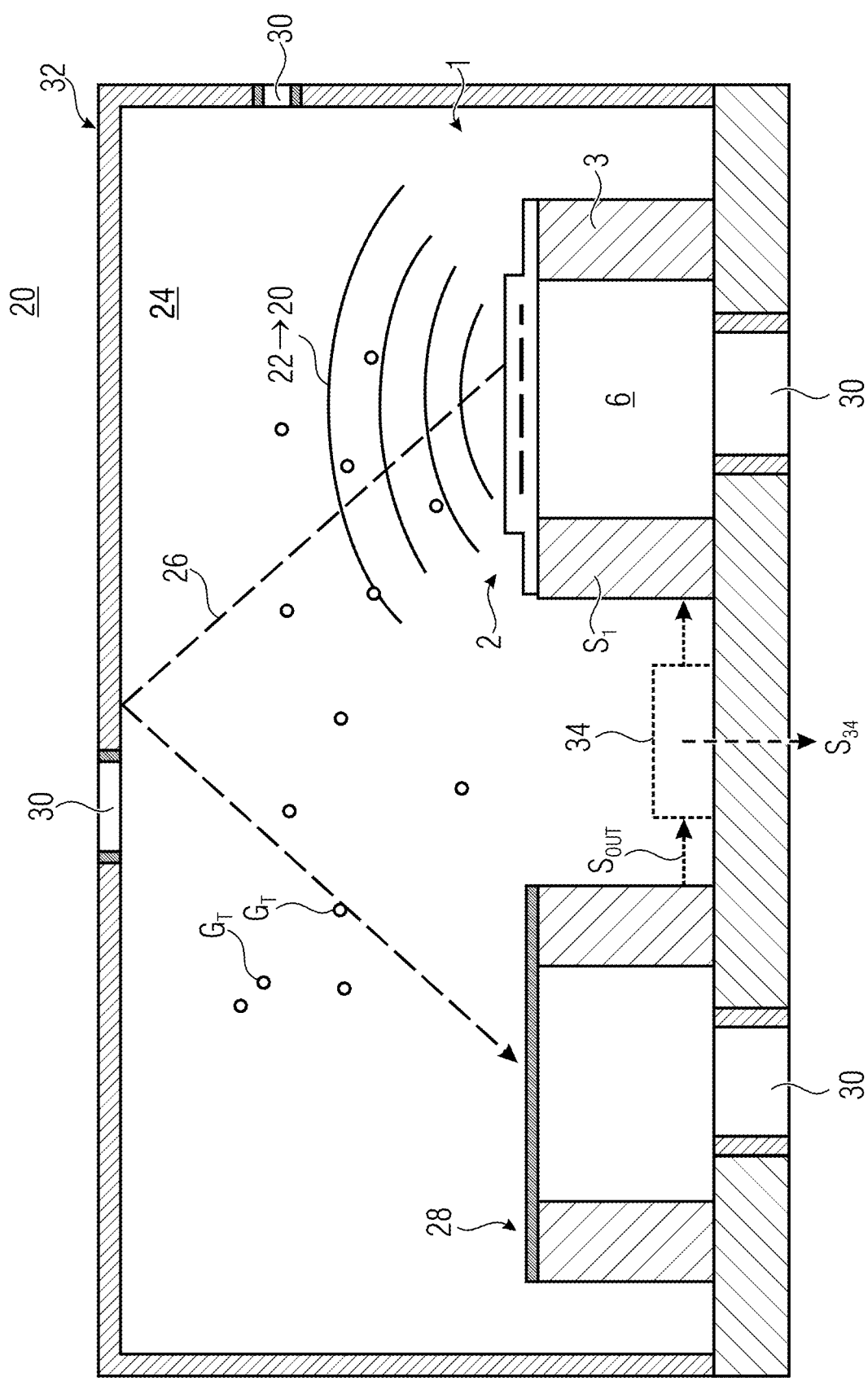
FIG. 6a shows a schematic cross-sectional view of a MEMS gas or fluid sensor according to an embodiment.

FIG. 6a shows a schematic cross-sectional view of a MEMS gas sensor or MEMS fluid sensor 20 according to an embodiment. The above evaluations, which relate to the thermal emitter 1, are equally applicable to the thermal emitter (=radiation source) 1 of FIG. 6a. In the present context, embodiments may relate to the detection and sensing of a gas or a gas component, which may be present in an environmental atmosphere, for example. However, the present concept is generally applicable to the detection and sensing of a fluid or a fluid component, wherein the term fluid may generally relate to a liquid or a gas. In case, the environmental medium relates to environmental air, the target fluid may relate to a target gas or target gas component which is present in the environmental air (=environmental atmosphere). The present concept is equally applicable to sensing a target liquid or a target liquid component in the environmental medium, an environmental gas or environmental liquid.

According to an embodiment, the MEMS gas sensor 20 may be arranged as a PAS sensor (PAS=photoacoustic spectroscopy) may comprise the thermal emitter 1 for emitting thermal radiation 22 and may comprise a measurement volume 24 having a target gas $G_T$ and providing an optical interaction path 26 for the emitted thermal radiation 22, and may comprise an acoustic transducer 28 or a thermal detector for providing a detector output signal Sour based on the optical interaction of the emitted thermal radiation 22 with the target gas $G_T$ in the measurement volume. As shown in FIG. 6a, the thermal emitter 1 and the acoustic transducer 28 are arranged inside a mutual measurement volume (=cavity) 24.

The photoacoustic principle offers a very high selectivity together with a relatively inexpensive set of components, for example the (infrared) emitter 1, an optional filter 9 and the detector 28. The PAS-principle shows, for example, a good sensitivity to carbon dioxide as target gas.

The cavity 24 is arranged for providing an optical interaction path 26 for an interaction of the thermal radiation 22 having a center wavelength $\lambda_o$ with a target gas $G_T$ in the cavity 24, wherein the cavity 24 is accessible, e.g. through at least one access opening 30 in a housing 32, for an environmental gas comprising the target gas component. The gas sensor 20 may be formed as a MEMS gas sensor (MEMS=micro-electromechanical system) in a PAS configuration. The cavity 24 may be formed as a waveguide or a reflecting housing 36, wherein reflective coatings such as metal layers on shaped structural housing walls (=cavity walls) may guide the emitted radiation thorough the interaction path by means of reflections. As shown in FIG. 6a, the cavity 24 is formed by the housing 32.

The particular wavelength of the emitted radiation 22 may be set to the respective gas or gas composition to be detected, i.e. the so-called analytic or target gas $G_T$. The emitter structure 1 may be configured to intermittently or periodically emit the thermal radiation 22. Accordingly, the environmental gas inside the measurement cavity 24, including the target gas, absorbs the intermittently emitted thermal radiation and, in consequence, the gases intermittently or periodically heats up and cools down in reaction to the emitted thermal radiation. The absorption and related heating and cooling of the gas inside the measurement cavity 24 may produce an alternating increase and decrease of pressure inside the cavity 24. These pressure variations may be detected by the acoustic transducer 28, for example a MEMS microphone. The amount of absorption of the emitted thermal radiation by the gases and the related pressure variations inside the cavity 24 may depend on the sort of gas inside the cavity 24 and it may vary with the respective target gas $G_T$ and its concentration. Each target gas $G_T$ may comprise a characteristic absorption spectrum, i.e. it may cause characteristic pressure variations in response to the emitted thermal radiation 22. Said characteristic absorption spectrum may also be referred to as a gas-specific fingerprint. Accordingly, the acoustic transducer 28 may record a signal that may be characteristic for the respective target gas $G_T$, such that the acoustic transducer 28 may thereby detect and identify the respective target gas $G_T$.

According to an embodiment, the gas sensor 20 may optionally comprise a processing circuit or controller 34 for providing a (e.g. time varying or pulsed) excitation signal Si to the IR emitter 1 and for reading out and, optionally, processing the respective output signal Sour of the acoustic transducer 28 and for providing a gas sensor output signal $S_{34}$ having an information on the concentration of the target gas component $G_T$ in the environmental gas in the cavity 24. The processing circuit 34 may be formed by an ASIC (ASIC=application specific integrated circuit).

Figure 6B:
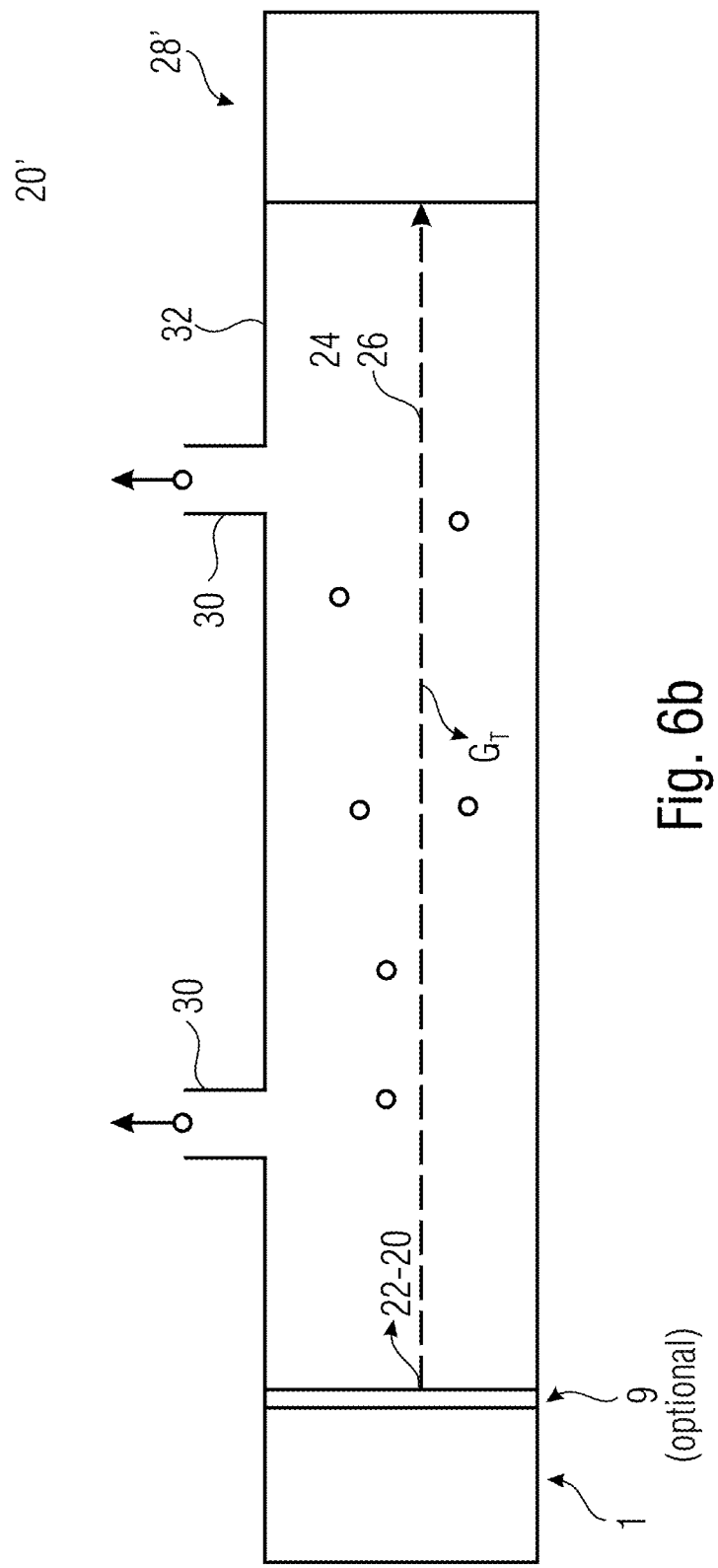
FIG. 6b shows a schematic cross-sectional view of a MEMS gas or fluid sensor according to an embodiment.

FIG. 6b shows a schematic cross-sectional view of a further example of a gas sensor or fluid sensor 20' according to an embodiment. The above evaluations, which relate to the thermal emitter 1, are equally applicable to the thermal emitter (=radiation source) 1 of FIG. 6b.

According to an embodiment, the MEMS gas sensor 20' may be arranged as a NDIR sensor (NDIR=nondispersive infrared). The MEMS gas sensor 20' may comprise the thermal emitter 1 for emitting thermal radiation 22 and may comprise a measurement volume 24 having a target gas $G_T$ and providing an optical interaction path 26 for the emitted thermal radiation 22, and may comprise a (direct) thermal detector 28' for providing a detector output signal Sour based on the optical interaction of the emitted thermal radiation 22 with the target gas $G_T$ in the measurement volume. As shown in FIG. 6b, the thermal emitter 1 and the detector 28 may be arranged outside the cavity 24.

The NDIR gas sensor 20' specifically measures the abundance, or concentration, of target gases $G_T$ in the sample chamber 24. If there are gases in the interaction path 26 from the infrared light source 1 to a detector 28' then, in the non-dispersive system, the IR radiation 22 is absorbed by the target gas(es), if the IR radiation 22 having a center wavelength Xo falls in the absorption spectrum of the target gas $G_T$. The degree of absorption depends on or is a measure of the concentration of a target gas $G_T$ in an environmental gas.

The cavity 24 may be formed as a waveguide or a reflecting housing 32, wherein reflective coatings such as metal layers on shaped structural housing walls (=cavity walls) may guide the emitted radiation thorough the interaction path by means of reflections. The cavity 24 is accessible, e.g. through at least one access opening 30 in a housing 32 for an environmental gas comprising the target gas component.

Additional embodiments and aspects are described which may be used alone or in combination with the features and functionalities described herein.

According to an embodiment, a thermal emitter comprises a freestanding membrane supported by a substrate, wherein the freestanding membrane comprises in a lateral extension a center section, a conductive intermediate section and a border section, wherein the conductive intermediate section laterally surrounds the center section and is electrically isolated from the center section, the conductive intermediate section comprising a conductive semiconductor material which is encapsulated in an insulating material, and wherein the border section at least partially surrounds the intermediate section and is electrically isolated from the conductive intermediate section, wherein a perforation is formed through the border section.

According to an embodiment, the freestanding membrane extends as a layer stack parallel to a main surface region of the substrate, wherein the layer stack comprises a conducting semiconductor layer which is encapsulated in an encapsulation layer having the insulating material.

According to an embodiment, the conductive intermediate section forms a branched current path separated by the center section.

According to an embodiment, the conductive intermediate section of the freestanding membrane comprises a heavily doped semiconductor layer which is encapsulated in the insulating material, wherein the conductive semiconductor material comprises poly-silicon or monocrystalline silicon, and wherein the insulating material comprises silicon nitride.

According to an embodiment, the conductive intermediate section of the freestanding membrane extends between two laterally opposing edge regions of the freestanding membrane.

According to an embodiment, the conductive intermediate section of the freestanding membrane comprises a plurality of conductor arms which extend between a plurality of associated edge regions of the freestanding membrane, wherein the plurality of arms of the conductive intermediate section and the edge regions of the freestanding membrane are arranged symmetrically with respect to a symmetry line through the center point of the center section.

According to an embodiment, the center section and the intermediate section of the freestanding membrane are arranged on a cavity in the substrate.

According to an embodiment, the freestanding membrane covers the cavity in the substrate, wherein the border section of the freestanding membrane is attached to the substrate.

According to an embodiment, the substrate comprises a bulk semiconductor substrate and an insulating layer, wherein the insulating layer forms a main surface region of the substrate to which the freestanding membrane is attached.

According to an embodiment, the perforation in the border section forms a ventilation hole or a plurality of ventilation holes in the freestanding membrane.

According to an embodiment, the border section of the freestanding membrane comprises a semiconductor layer encapsulated in an insulating material or comprises an insulating material layer.

According to an embodiment, the center section of the freestanding membrane comprises a semiconductor layer encapsulated in an insulating material or comprises an insulating material layer.

According to an embodiment, the center section of the freestanding membrane is a disc-shaped heat spreader structure having a highly thermal conductive material with a thermal conductivity $\kappa \geq 30$ W/m*K, e.g. at 298° C.

According to an embodiment, the thermal emitter further comprises a plasmonic structure on the center section and the conductive intermediate section of the freestanding membrane, wherein the plasmonic structure forms a bandpass filter for an IR radiation emitted by the freestanding membrane during an operation of the thermal emitter.

According to an embodiment, the plasmonic structure forms a plasmonic resonator for the emitted IR radiation.

According to an embodiment, the thermal emitter forms a MEMS IR emitter having an operating temperature in the range between 800 to 1100° C.

According to an embodiment, a MEMS gas or fluid sensor comprises the above thermal emitter for emitting thermal radiation, a measurement volume having a target gas or target fluid and providing an optical interaction path for the emitted thermal radiation, and an acoustic transducer or a (direct) thermal detector for providing a detector output signal based on the optical interaction of the emitted thermal radiation with the target gas or target fluid in the measurement volume.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

In the foregoing detailed Description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

Although specific embodiments have been illustrated and described herein, it will be appreciated by those of ordinary skill in the art that a variety of alternate and/or equivalent implementations may be substituted for the specific embodiments shown and described without departing from the scope of the present embodiments. This application is intended to cover any adaptations or variations of the specific embodiments discussed herein. Therefore, it is intended that the embodiments be limited only by the claims and the equivalents thereof.

What is claimed is:
1. A thermal emitter comprising:
 a freestanding membrane supported by a substrate, wherein the freestanding membrane comprises in a lateral extension a center section, an electrically conductive intermediate section and a border section,
 wherein the conductive intermediate section forms a ring-shaped heating element that laterally surrounds the center section and is electrically isolated from the center section, the conductive intermediate section comprising a conductive semiconductor material which is encapsulated in an insulating material, and
 wherein the border section at least partially surrounds the intermediate section and is electrically isolated from the conductive intermediate section, wherein a perforation is formed through the border section, and
 wherein the conductive intermediate section of the freestanding membrane comprises a heavily doped semi- conductor layer having a doping concentration in a range between $10^{18}$ and $10^{20}$ doping atoms/cm$^3$.

2. The thermal emitter of claim 1, wherein the freestanding membrane extends as a layer stack parallel to a main surface region of the substrate, wherein the layer stack comprises a conducting semiconductor layer which is encapsulated in an encapsulation layer having the insulating material.

3. The thermal emitter of claim 1, wherein the conductive intermediate section forms a branched current path separated by the center section.

4. The thermal emitter of claim 1, wherein the conductive semiconductor material comprises poly-silicon or monocrystalline silicon, and wherein the insulating material comprises silicon nitride.

5. The thermal emitter of claim 1, wherein the conductive intermediate section of the freestanding membrane extends between two laterally opposing edge regions of the freestanding membrane.

6. The thermal emitter of claim 1, wherein the conductive intermediate section of the freestanding membrane comprises a plurality of conductor arms which extend between a plurality of associated edge regions of the freestanding membrane, wherein the plurality of conductor arms of the conductive intermediate section and the edge regions of the freestanding membrane are arranged symmetrically with respect to a symmetry line through the center point of the center section.

7. The thermal emitter of claim 1, wherein the center section and the intermediate section of the freestanding membrane are arranged on a cavity in the substrate.

8. The thermal emitter of claim 7, wherein the freestanding membrane covers the cavity in the substrate, wherein the border section of the freestanding membrane is attached to the substrate.

9. The thermal emitter of claim 1, wherein the substrate comprises a bulk semiconductor substrate and an insulating layer, wherein the insulating layer forms a main surface region of the substrate to which the freestanding membrane is attached.

10. The thermal emitter of claim 1, wherein the perforation in the border section forms a ventilation hole or a plurality of ventilation holes in the freestanding membrane.

11. The thermal emitter of claim 1, wherein the border section of the freestanding membrane comprises a semiconductor layer encapsulated in an insulating material or comprises an insulating material layer.

12. The thermal emitter of claim 1, wherein the center section of the freestanding membrane comprises a semiconductor layer encapsulated in an insulating material or comprises an insulating material layer.

13. The thermal emitter of claim 1, wherein the center section of the freestanding membrane is a disc-shaped heat spreader structure having a highly thermal conductive material with a thermal conductivity $\kappa \geq 30$ W/m*K, e.g. at 298° C.

14. The thermal emitter of claim 1, further comprising a plasmonic structure on the center section and the conductive intermediate section of the freestanding membrane, wherein the plasmonic structure forms a bandpass filter for an IR radiation emitted by the freestanding membrane during an operation of the thermal emitter.

15. The thermal emitter of claim 14, wherein the plasmonic structure forms a plasmonic resonator for the emitted IR radiation.

16. The thermal emitter of claim 1, wherein the thermal emitter forms a MEMS IR emitter having an operating temperature in the range between 800 to 1100° C.

17. A MEMS gas or fluid sensor, comprising:
a thermal emitter for emitting thermal radiation according to claim 1,
a measurement volume having a target gas or target fluid and providing an optical interaction path for the emitted thermal radiation, and
an acoustic transducer or a direct thermal detector for providing a detector output signal based on the optical interaction of the emitted thermal radiation with the target gas or target fluid in the measurement volume.

* * * * *

UNITED STATES PATENT AND TRADEMARK OFFICE
CERTIFICATE OF CORRECTION

PATENT NO. : 11,668,683 B2
APPLICATION NO. : 17/199211
DATED : June 6, 2023
INVENTOR(S) : Glacer et al.

It is certified that error appears in the above-identified patent and that said Letters Patent is hereby corrected as shown below:

In the Claims

In Column 16, in Claim 1, Line 61, after "material," delete "and".

In Column 18, in Claim 13, Line 15, delete "W/m*K, e.g." and insert -- W/m*K --, therefor.

Signed and Sealed this
Twenty-second Day of August, 2023

Katherine Kelly Vidal
*Director of the United States Patent and Trademark Office*